(12) United States Patent
Borud et al.

(10) Patent No.: US 12,552,474 B2
(45) Date of Patent: Feb. 17, 2026

(54) SNOW TRACK FOR A SNOWMOBILE

(71) Applicant: Polaris Industries Inc., Medina, MN (US)

(72) Inventors: Eric J. Borud, Roseau, MN (US); Matthew J. Prusak, Salol, MN (US); Jeffrey N. Johnson, Warroad, MN (US); Michael A. Hedlund, Roseau, MN (US)

(73) Assignee: Polaris Industries Inc., Medina, MN (US)

(*) Notice: Subject to any disclaimer, the term of this patent is extended or adjusted under 35 U.S.C. 154(b) by 816 days.

(21) Appl. No.: 17/841,598

(22) Filed: Jun. 15, 2022

(65) Prior Publication Data
US 2022/0411019 A1   Dec. 29, 2022

Related U.S. Application Data

(60) Provisional application No. 63/214,155, filed on Jun. 23, 2021.

(51) Int. Cl.
*B62D 55/24* (2006.01)
*B62M 27/02* (2006.01)

(52) U.S. Cl.
CPC .......... *B62D 55/244* (2013.01); *B62M 27/02* (2013.01); *B62M 2027/027* (2013.01)

(58) Field of Classification Search
CPC ....... B62D 55/244; B62D 55/07; B62D 55/24
See application file for complete search history.

(56) References Cited

U.S. PATENT DOCUMENTS

| | | | | |
|---|---|---|---|---|
| 3,664,715 | A * | 5/1972 | Huber | B62D 55/244 305/179 |
| 7,422,295 | B2 * | 9/2008 | Rasmussen | B62D 55/244 305/179 |
| 8,708,432 | B2 * | 4/2014 | Pard | B62D 55/12 305/195 |
| 9,481,413 | B2 * | 11/2016 | Pard | B62M 27/02 |
| 10,392,060 | B2 * | 8/2019 | Dandurand | B62M 27/02 |
| 10,870,456 | B2 * | 12/2020 | Dandurand | B62D 55/244 |
| 11,097,793 | B2 * | 8/2021 | Marchildon | B62D 55/104 |
| 11,970,225 | B2 * | 4/2024 | Bates, Jr. | B62D 55/18 |
| 2004/0178677 | A1 * | 9/2004 | St-Pierre | B62D 55/244 305/165 |

(Continued)

FOREIGN PATENT DOCUMENTS

CA    3095138 A1    4/2021

OTHER PUBLICATIONS

Requisition by the Examiner for related Canadian Application No. 3164625, dated Oct. 10, 2023, 8 pages.

*Primary Examiner* — Jason R Bellinger
(74) *Attorney, Agent, or Firm* — Merchant & Gould P.C.

(57) ABSTRACT

An endless track for propelling a snowmobile. The endless track includes an inner drive surface, and an outer ground-engaging surface opposite to the inner drive surface. A plurality of reinforcing rods each extend along a track width in rod rows and are spaced apart at a drive pitch length along a track length. A plurality of treads each extend from the outer ground-engaging surface and are spaced apart at a tread pitch length along the track length. At least two of the plurality of reinforcing rods have different lengths.

29 Claims, 9 Drawing Sheets

(56) References Cited

U.S. PATENT DOCUMENTS

2011/0074210 A1\* 3/2011 Paradis ................ B62D 55/096
305/165
2013/0134772 A1 5/2013 Dandurand et al.
2017/0057573 A1\* 3/2017 Gentry ................ B62D 55/112

\* cited by examiner

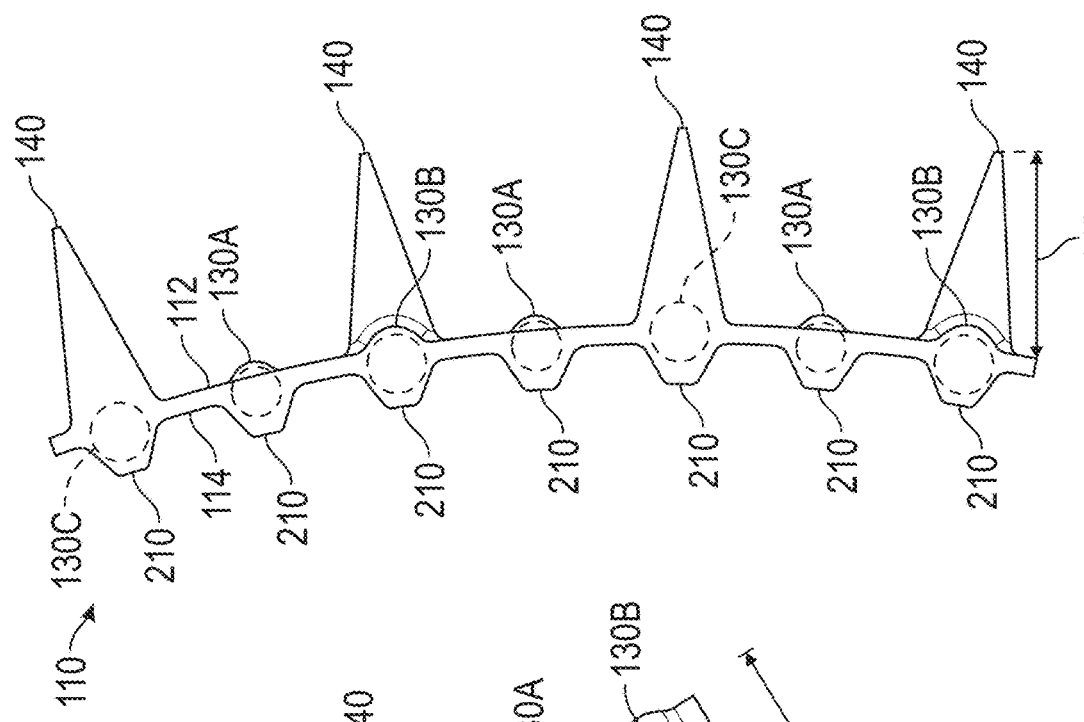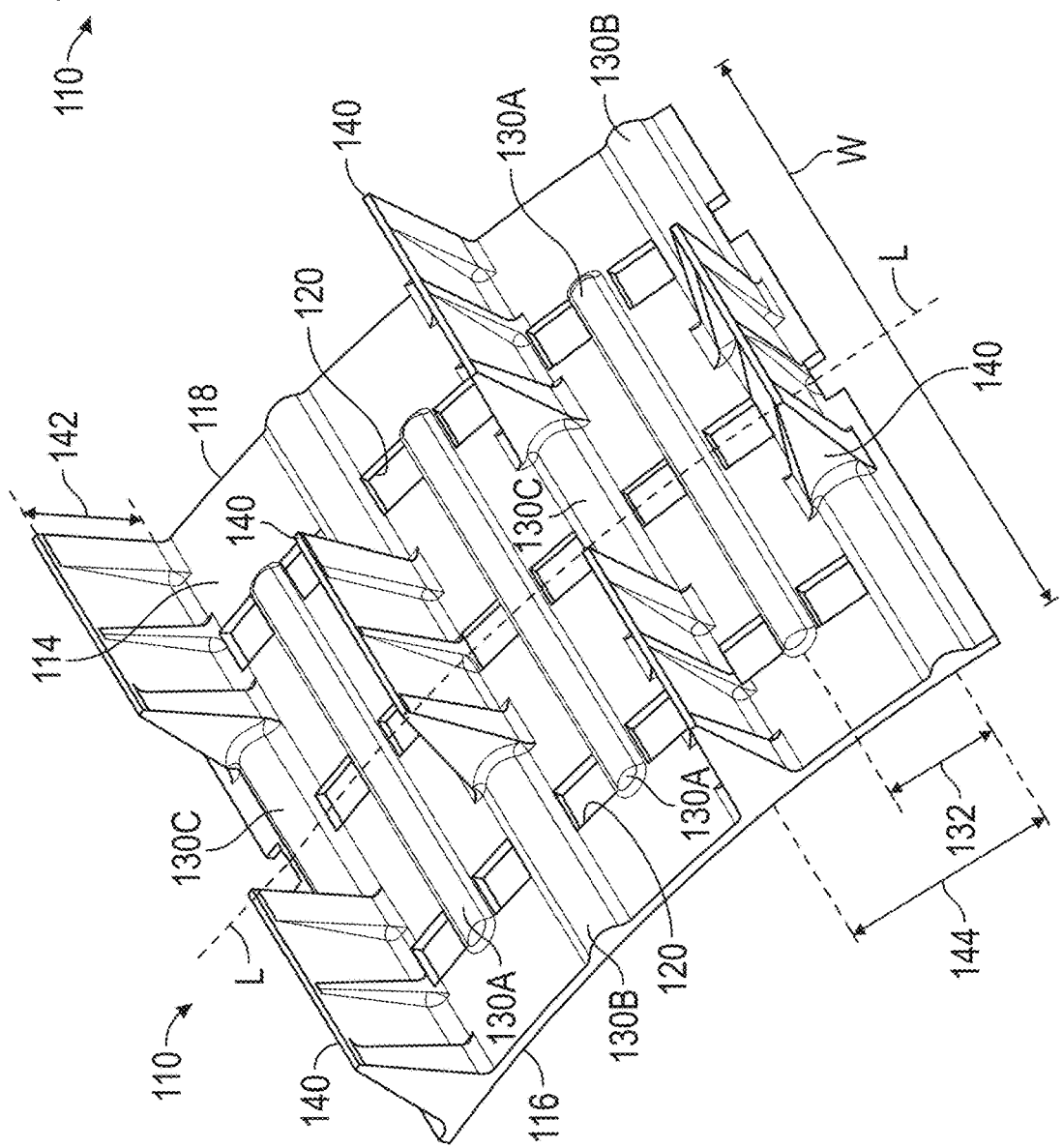

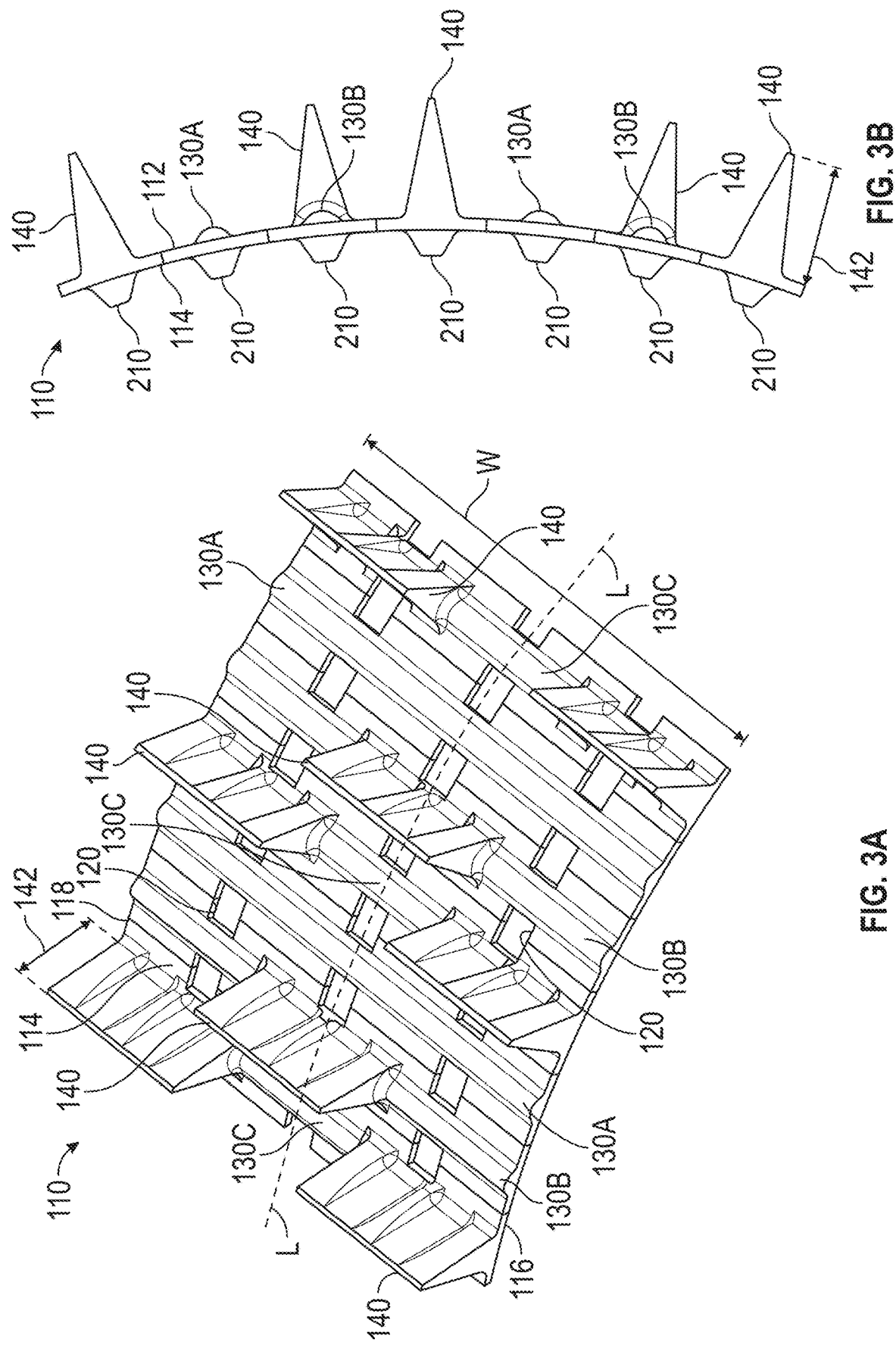

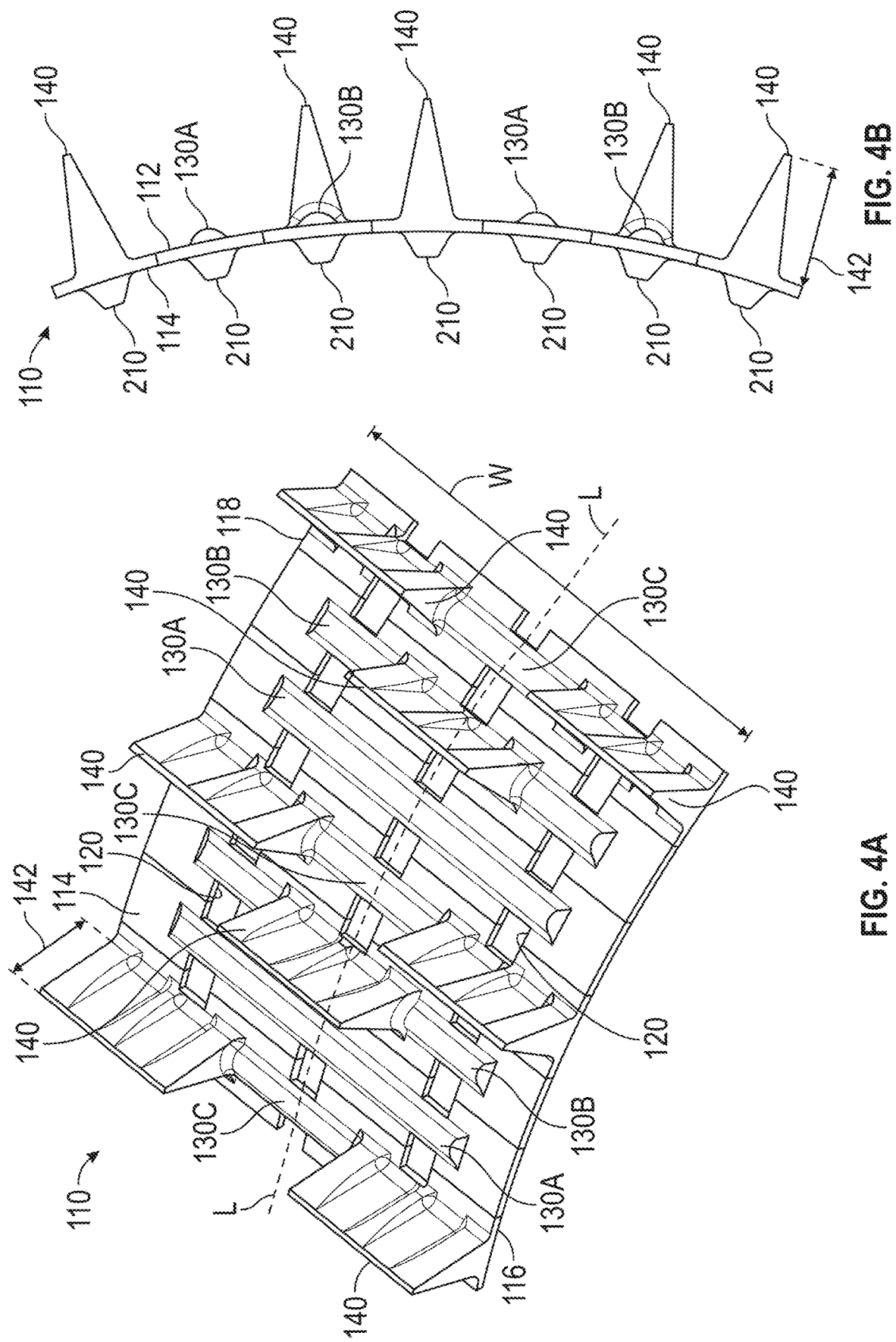

SNOW TRACK FOR A SNOWMOBILE

CROSS-REFERENCE TO RELATED APPLICATIONS

This application claims the benefit of U.S. Provisional Application No. 63/214,155, filed on Jun. 23, 2021. The entire disclosure of the above application is incorporated herein by reference.

FIELD

The present disclosure relates to an endless track for a snowmobile.

BACKGROUND

This section provides background information related to the present disclosure, which is not necessarily prior art.

Tracked vehicles, such as a snowmobile, include an endless track or belt that is driven by a snowmobile drive assembly. These drive assemblies generally have a pair of spaced apart wheel structures on opposed sides or ends of the snowmobile to carry and drive the track. The track typically includes an outer ground-engaging surface and an inner drive surface. The inner drive surface generally has a series of longitudinally spaced lugs or members that are driven by a drive sprocket of the snowmobile and are also used for guiding relative to a rail beam or slide, as is known in the art. The ground-engaging surface of a typical track will include various tread configurations that are both spaced apart and non-continuous both longitudinally and laterally relative to the track for use in engaging various types of snow conditions. While existing tracks are suitable for their intended use, they are subject to improvement. The present disclosure advantageously includes endless tracks with improved performance and weight savings. The endless tracks of the present disclosure provide numerous additional advantages and unexpected results, as explained in detail herein and as one skilled in the art will appreciate.

SUMMARY

This section provides a general summary of the disclosure, and is not a comprehensive disclosure of its full scope or all of its features.

The present disclosure includes an endless track for propelling a snowmobile. The endless track includes an inner drive surface, and an outer ground-engaging surface opposite to the inner drive surface. A plurality of reinforcing rods each extend along a track width in rod rows and are spaced apart at a drive pitch length along a track length. A plurality of treads each extend from the outer ground-engaging surface and are spaced apart at a tread pitch length along the track length. At least two of the plurality of reinforcing rods can have different lengths.

The present disclosure also includes a track for propelling a snowmobile. The track has an inner drive surface, and an outer ground-engaging surface opposite to the inner drive surface. A plurality of reinforcing rods each extend along a track width in rod rows and are spaced apart at a drive pitch length along a track length. A plurality of treads are spaced apart at a tread pitch length along the track length. At least two of the plurality of reinforcing rods can have different diameters.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 2A is a perspective view of an outer, ground-engaging surface of an exemplary endless track in accordance with the present disclosure for the snowmobile of FIG. 1;

FIG. 2B is a side-view of the endless track of FIG. 2A;

FIG. 3A is a perspective view of an outer, ground-engaging surface of another exemplary endless track in accordance with the present disclosure for the snowmobile of FIG. 1;

FIG. 3B is a side-view of the endless track of FIG. 3A;

FIG. 4A is a perspective view of an outer, ground-engaging surface of an additional exemplary endless track in accordance with the present disclosure for the snowmobile of FIG. 1;

FIG. 4B is a side-view of the endless track of FIG. 4A;

Corresponding reference numerals indicate corresponding parts throughout the several views of the drawings.

DETAILED DESCRIPTION

Example embodiments will now be described more fully with reference to the accompanying drawings. Although the following description includes several examples of a snowmobile application, it is understood that the features herein may be applied to any appropriate tracked vehicle. The examples disclosed below are not intended to be exhaustive or to limit the disclosure to the precise forms disclosed in the following detailed description. Rather, the examples are chosen and described so that others skilled in the art may utilize their teachings.

Figure 1:
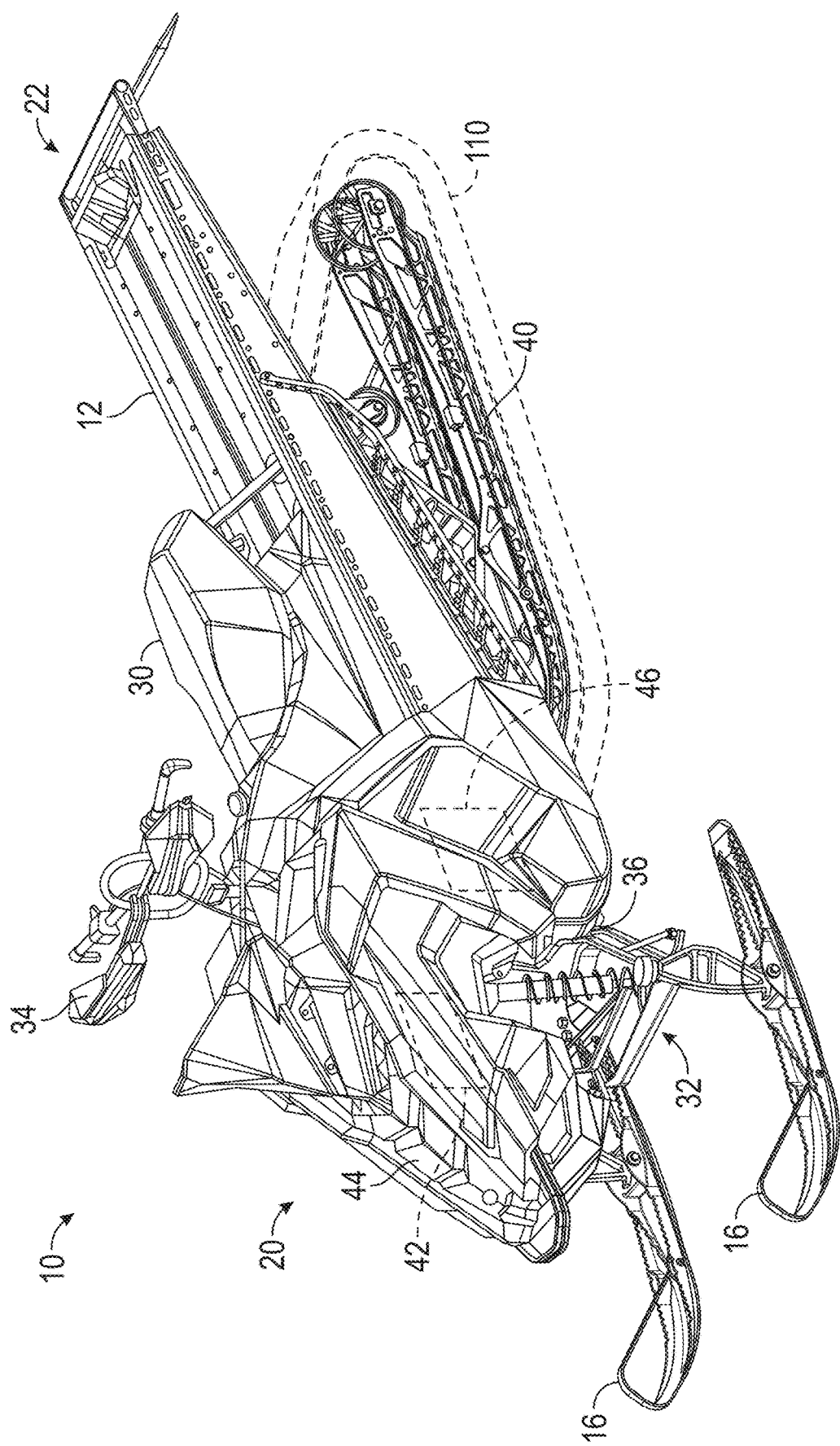
FIG. 1 is a perspective view of an exemplary snowmobile.

Referring now to FIG. 1, one embodiment of an exemplary snowmobile 10 is shown. The snowmobile 10 includes a chassis assembly 12, an endless belt or track 110, and a pair of front skis 16. The skis 16 are at a front-end 20 of the snowmobile 10. The front-end 20 is opposite to a rear-end 22 of the snowmobile 10.

The snowmobile 10 also includes a seat assembly 30, which is coupled to the chassis assembly 12. A front suspension assembly 32 is also coupled to the chassis assembly 12. The front suspension assembly 32 may include handlebars 34 for steering, shock absorbers 36 and the skis 16. A rear suspension assembly 40 is also coupled to the chassis assembly 12. The rear suspension assembly 40 may be used to support the endless track 110 for propelling the snowmobile 10. An electrical console assembly is also coupled to the chassis assembly 12. The snowmobile 10 includes an engine assembly 42 arranged under a hood assembly 44 of the chassis assembly 12. A drivetrain assembly 46 converts a rotating force from the engine assembly 42 into a potential force to use, drive, and rotate the endless belt or track 110, which propels the snowmobile 10.

The snowmobile 10 of FIG. 1 is illustrated for exemplary purposes only. Any type of tracked snowmobile or other tracked vehicle may include the endless track 110 of the present disclosure. For example, mountain, touring, racing, performance, and other snowmobile configurations may be propelled by the endless track 110. The endless track 110 is configured to operate in any type of snow conditions, such as, but not limited to, sugar, ice, wet, heavy, as well as on various terrains. The track 110 is also configured to operate over any suitable terrain, such as track, mountainous, ice, etc.

Figure 2C:
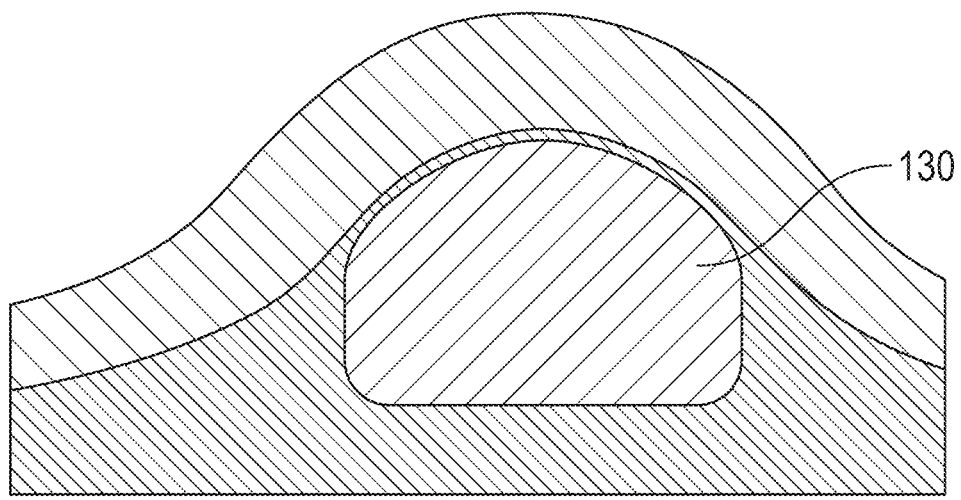
FIG. 2C is a cross-sectional view of an exemplary reinforcing rod of the endless track.

With additional reference to FIGS. 2A and 2B, an exemplary configuration of the endless track 110 accordance with the present disclosure will now be described in detail. The track 110 is a continuous track that rotates 360° to propel the snowmobile 10. The track 110 is primarily formed of a rubber material, including multiple fabric layers, as is known in the art. The track 110 includes an outer ground-engaging surface 112, and an inner drive surface 114, which are opposite to one another. A track width W of the track 110 extends from a first side surface 116 to a second side surface 118. The track width W extends perpendicular to a track length L extending along a longitudinal axis of the track 110.

The track 110 further includes a plurality of reinforcing bars or rods, which in FIGS. 2A and 2B include first reinforcing rods 130A, second reinforcing rods 130B, and third reinforcing rods 130C. The reinforcing rods 130A-130C are arranged in rod rows extending along the track width W perpendicular to the track length L. The reinforcing rods 130A-130C are spaced apart from each other along the track length L at a drive pitch length 132. The drive pitch length 132 may be any suitable distance, such as 2 inches or about 2 inches, for example, and may include rods or be devoid of rods. The reinforcing rods 130A-130C may be made of any suitable material, such as fiberglass, any suitable composite material, or steel, for example. The reinforcing rods 130A-130C may be embedded in the track 110 between the outer ground-engaging surface 112 and the inner drive surface 114, or mounted to the track 110 in any other suitable manner. The reinforcing rods 130A-130C provide strength and rigidity to the track 110 to improve performance thereof.

The reinforcing rods 130A-130C can have various different lengths and diameters, or the same lengths and diameters. In the example of FIGS. 2A and 2B, the first reinforcing rods 130A extend across less than an entirety of the track width W, and are centered between the first side surface 116 and the second side surface 118. The first reinforcing rods 130A have a diameter that is smaller than diameters of each of the second and the third reinforcing rods 130B and 130C. The second reinforcing rods 130B extend entirely across the width W from the first side surface 116 to the second side surface 118, and each have a diameter that is greater than the diameter of the first reinforcing rods 130A. Similarly, the third reinforcing rods 130C extend entirely across the width W from the first side surface 116 to the second side surface 118, and each have a diameter that is greater than the diameters of the first reinforcing rods 130A. The diameters of the third reinforcing rods 130C are the same as, or similar to, the diameters of the second reinforcing rods 130B. Each one of the reinforcing rods 130A, 130B, 130C, may have a uniform diameter across the track width W, or have varying diameters. For example, the diameters of each of the reinforcing rods 130A, 130B, 130C can be relatively greater at the center of the track width W, and relatively smaller proximate to the first and second side surfaces 116, 118, which may provide increased flexibility of the track 110 at and proximate to the first and second side surfaces 116, 118.

Figure 2D:
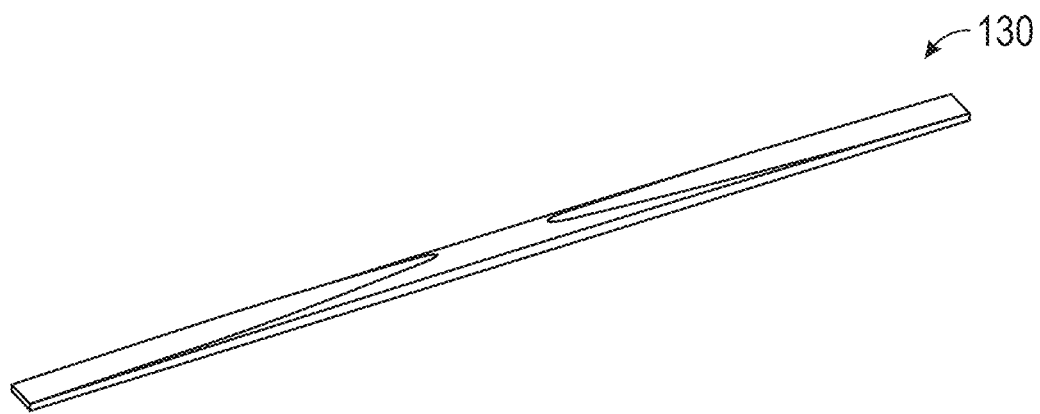
FIG. 2D is a perspective view of another exemplary reinforcing rod of the endless track.
Figure 2E:
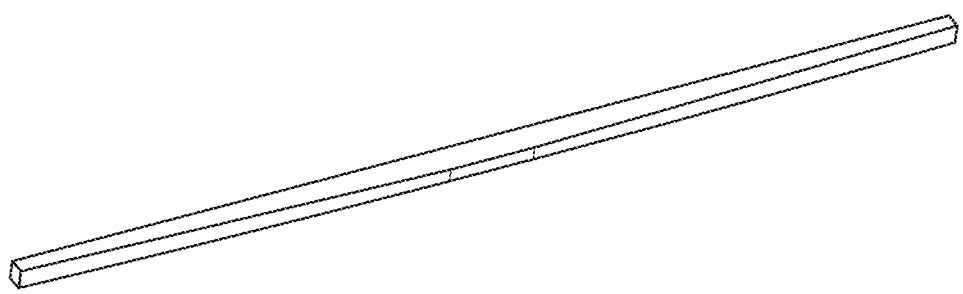
FIG. 2E is a perspective view of an additional exemplary reinforcing rod of the endless track.

The reinforcing rods 130A-130C may have any suitable cross-sectional shape. For example, one or more of the reinforcing rods 130A-130C may have the cross-sectional shape of the rod 130 of FIG. 2C, may be round, oval, polygonal, domed, etc. The reinforcing rods 130A-130C may have a constant shape across the width W, or a shape that varies across the width W. The reinforcing rods 130A-130C may have a constant cross-sectional size across with width W, or may vary in cross-sectional size across the width W. FIGS. 2D and 2E illustrate exemplary reinforcing rods 130 that vary in shape and size across the width W.

The reinforcing rods 130A-130C may have any suitable varying cross-sectional shape and/or size along the width W that will allow the rods 130A-130C to be relatively more flexible in the middle than at the ends thereof near the first and second side surfaces 116, 118 of the track 110 (see FIG. 2D, for example). Alternatively, the reinforcing rods 130A-130C may have any suitable varying cross-sectional shape and/or size along the width W that will allow the rods 130A-130C to be relatively stiffer in the middle than at the ends thereof near the first and second side surfaces 116, 118 of the track 110 (see FIG. 2E, for example).

The track 110 further includes a plurality of treads 140 extending from the outer ground-engaging surface 112. The treads 140 extend from the outer ground-engaging surface 112 to any suitable height, and thus the treads 140 have any suitable tread length/height 142 as measured from the outer ground-engaging surface 112 to an end tip of the treads 140. The tread length 142 may be from about 1 to about 4 inches and up to 4 inches, or about 4 inches, for example. The treads 140 are configured to engage a ground surface that the track 110 is traveling over to facilitate traction between the track 110 and the ground. The treads 140 may be made of any suitable material, such as any suitable rubber or polymeric material. The treads 140 are spaced apart at a tread pitch length 144 along the track length L. The tread pitch length 144 may be any suitable length, such as 4 inches, about 4 inches, or greater than 4 inches for example, which is measured only between rows that include treads 140, such as shown in FIGS. 2A and 2B (i.e. tread to tread). Thus, generally, an inner drive pitch between adjacent drive lugs 210 is less than the tread length 142, which is less than or equal to the tread pitch length 144.

Each tread 140 may be associated with one of the reinforcing rods 130A, 130B, 130C. In the example of FIGS. 2A and 2B, none of the treads 140 are associated with the first reinforcing rods 130A. Thus, the first reinforcing rods 130A are without (or devoid of) treads 140. A single tread 140 is associated with the second reinforcing rods 130B at the center of each second reinforcing rod 130B midway between the first side surface 116 and the second side surface 118. Each second reinforcing rod 130B thus has one tread 140 arranged thereon, such as by over-molding the tread 140 onto the second reinforcing rod 130B. With respect to the third reinforcing rods 130C, two treads 140 are associated with each third reinforcing rod 130C. The two treads 140 are arranged on opposite sides of the third reinforcing rods 130C, with a first tread 140 at the first side surface 116 and a second tread 140 at the second side surface 118. Each third reinforcing rod 130C thus has two treads 140 arranged thereon, such as by over-molding the treads 140 onto the third reinforcing rods 130B.

Thus, alternating rod rows of reinforcing rods 130A-130C can include at least one of the treads 140. In other words, every other rod row of rods 130A-130C along the track length L can include at least one tread 140. Each rod row of rods 130B, 130C with at least one of the treads 140 is between two of the rods 130A without any treads 140. Each one of the first rods 130A is between one of the second rods 130B with one tread 140 and one of the third rods 130C with two treads 140. Each one of the second rods 130B with one tread 140 is between two of the first rods 130A. Each one of the third rods 130C with two treads 140 is between two of the first rods 130A. The pattern illustrated in FIGS. 2A and 2B repeats along the entire track 110. The tread pitch length 144 is twice as long as the drive pitch length 132. The tread height/length 142 can be equal to or less than the tread pitch length 144.

The track 110 may have any suitable ratio of tread length 142 to track width W, such as a ratio of 0.22 or less, for example. As an example, the tread length 142 may be 3.3 inches and the track width W may be 15 inches for a ratio of 0.22. As another example, the tread length 142 may be 3.25 inches and the track width W may be 15 inches for a ratio of 0.216. The track 110 with the ratio of 0.22 or less, for example, is particularly suitable for a vehicle with two skis 16.

An alternative configuration of the track 110 is illustrated in FIGS. 3A and 3B. In the configuration of FIGS. 3A and 3B, each of the second rods 130B with one tread 140 is between one of the first rods 130A without treads 140 and one of the third rods 130C with two treads 140. Each of the third rods 130C with two treads 140 is between one of the first rods 130A without treads 140 and one of the second rods 130B with one of the treads 140. The first rods 130A extend entirely across the track width W from the first side surface 116 to the second side surface 118. All of the rods 130A, 130B, 130C in the configuration of FIGS. 3A and 3B may have the same or similar diameter as illustrated, or varying diameters. The pattern illustrated in FIGS. 3A and 3B repeats along the entire track 110.

An additional configuration of the track 110 is illustrated in FIGS. 4A and 4B. The configuration of FIGS. 4A and 4B is similar to the configuration of FIGS. 3A and 3B, but the first rods 130A and the second rods 130B extend across less than an entirety of the track width W. The second rods 130B are directly adjacent to the third rods 130C, but on a side thereof that is opposite to the configuration of FIGS. 3A and 3B. The pattern illustrated in FIGS. 4A and 4B repeats along the entire track 110. Furthermore, the treads 140 may have concave and/or convex portions along the track width W, as disclosed in U.S. patent application Ser. No. 16/590,762 filed on Oct. 2, 2019 and titled "Snow Track for a Snowmobile," which is incorporated herein by reference.

Figure 5B:
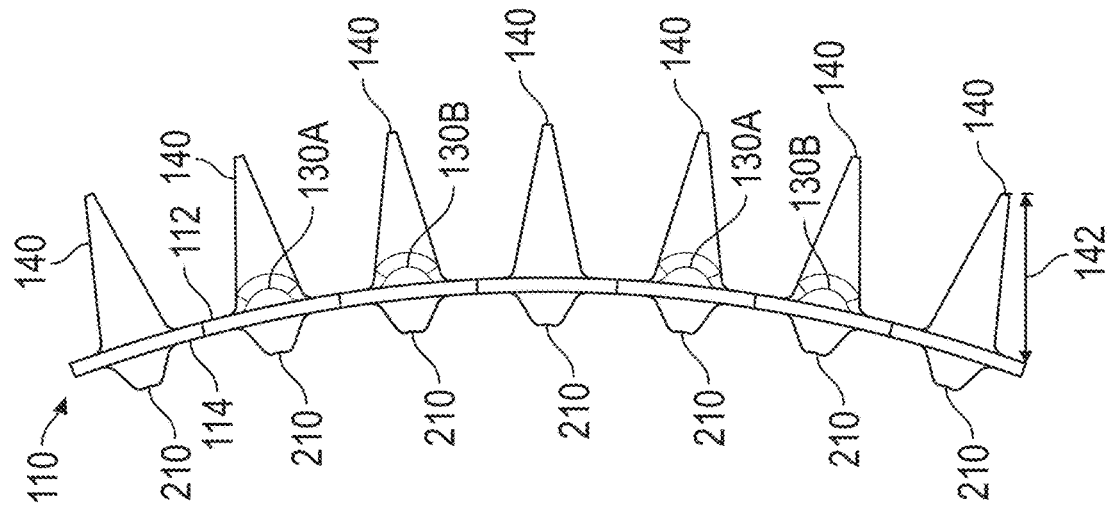
FIG. 5B is a side-view of the endless track of FIG. 5A.
Figure 5A:
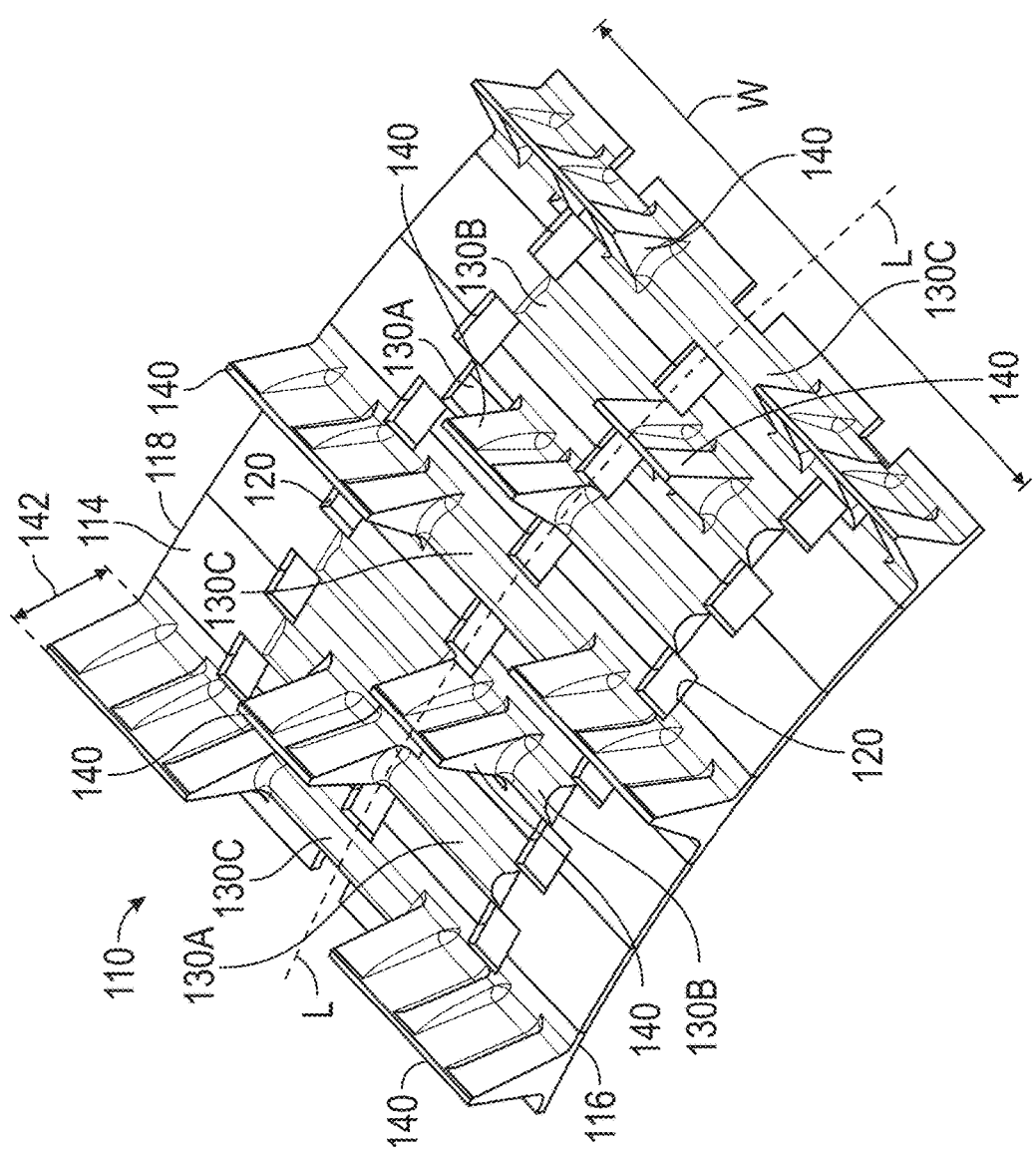
FIG. 5A is a perspective view of an outer, ground-engaging surface of yet another exemplary endless track in accordance with the present disclosure for the snowmobile of FIG. 1.

FIGS. 5A and 5B illustrate another exemplary configuration of the track 110. In the example of FIGS. 5A and 5B, the second rods 130B are shorter than the configuration of FIGS. 4A and 4B, and include a tread 140 that is offset from a longitudinal center of the track 110, which is halfway between the first side surface 116 and the second side surface 118 and lies along line L. The first rods 130A are also shortened along the track width W, and include a single tread 140. The single tread 140 of the first rods 130A is on a side of line L opposite to the tread 140 of the second rods 130B. Each one of the first rods 130A is arranged between one of the second rods 130B and one of the third rods 130C. Each one of the second rods 130B is arranged between one of the first rods 130A and one of the third rods 130C. Each one of the third rods 130C is arranged between one of the first rods 130A and one of the second rods 130B. The configuration of FIG. 5A repeats along the entire track length L of the track 110.

Figure 6:
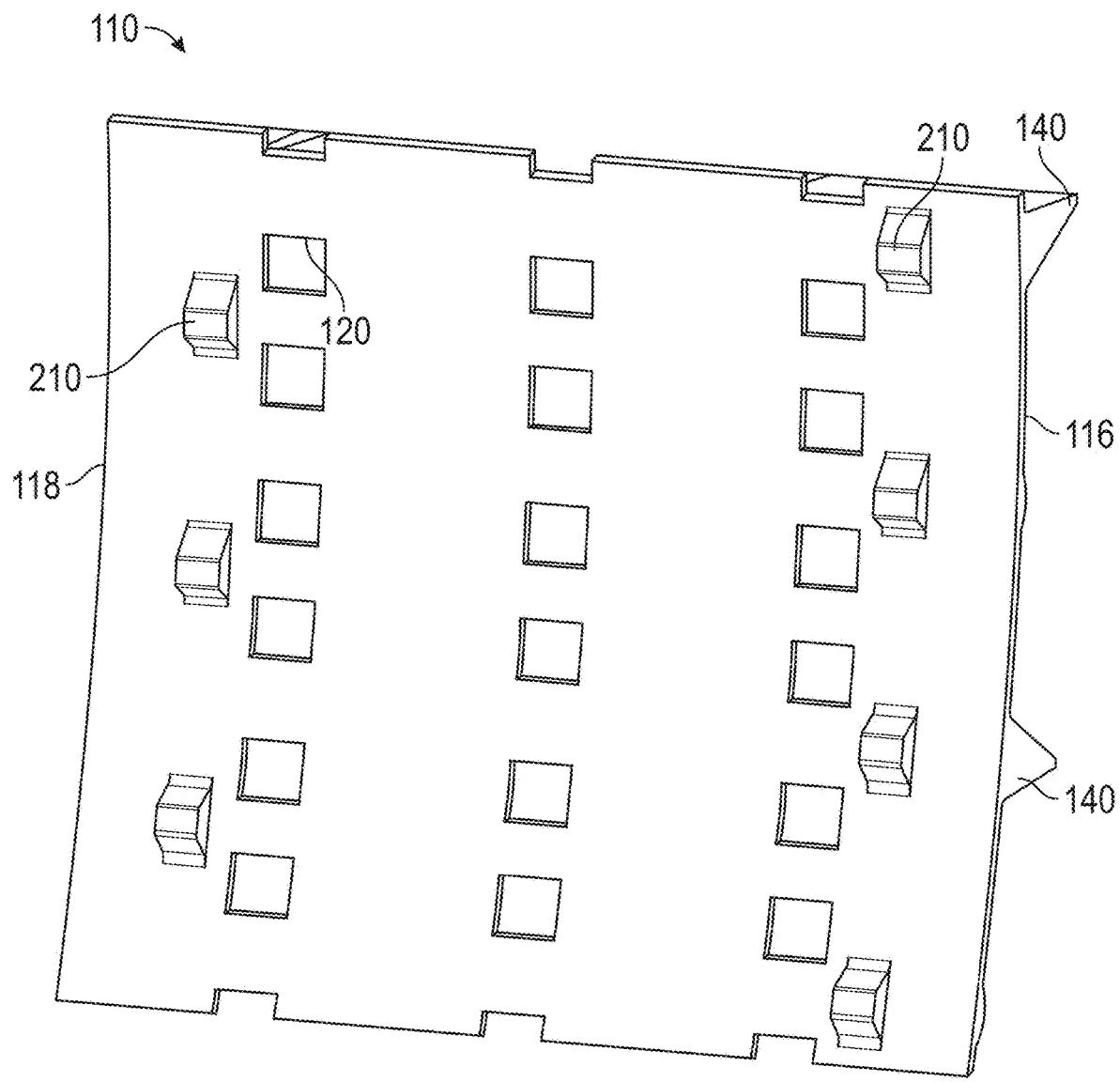
FIG. 6 is a perspective view of an inner drive surface of an additional exemplary endless track in accordance with the present disclosure.
Figure 7:
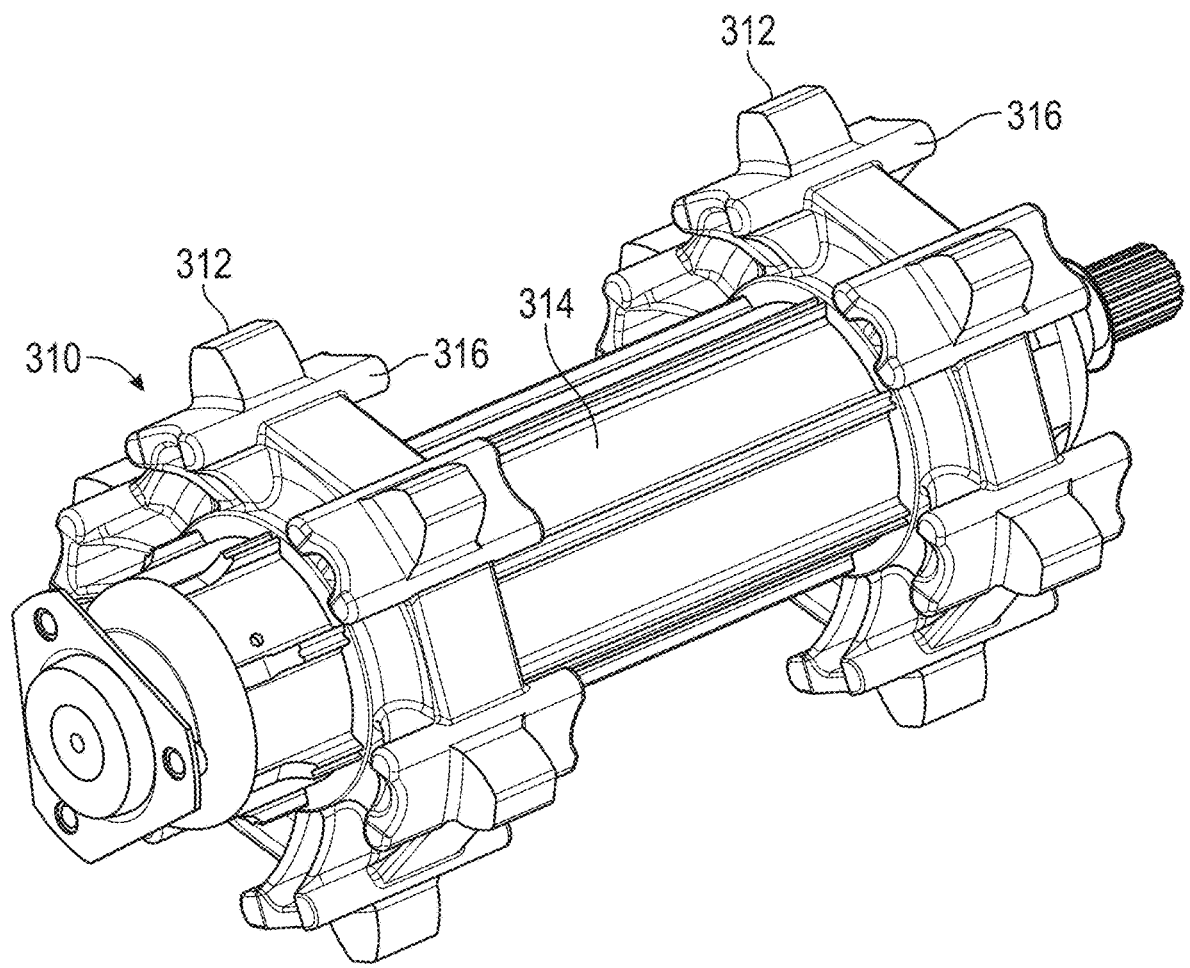
FIG. 7 is a perspective view of a drive shaft for driving any of the exemplary endless tracks.
Figure 8:
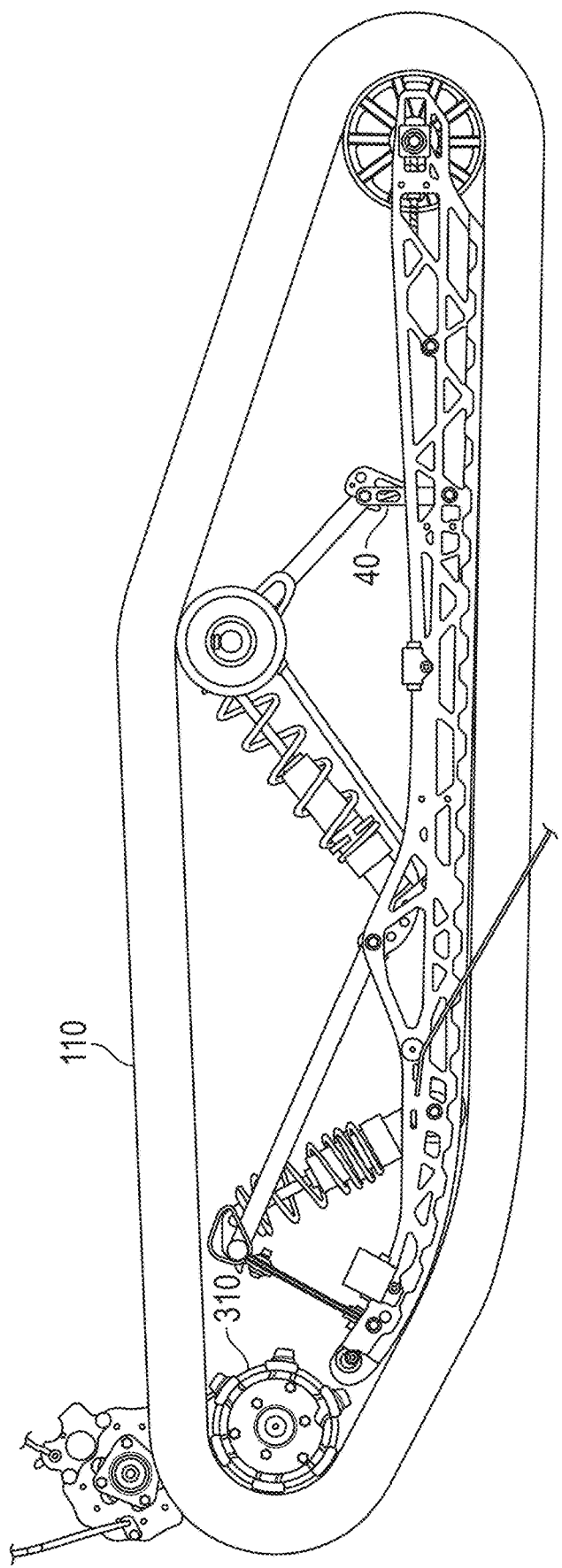
FIG. 8 is a side view a suspension of the snowmobile of FIG. 1 and one of the exemplary endless tracks.

FIG. 6 illustrates the inner drive surface 114 of the track 110. Any suitable number of the drive lugs 210 are spaced apart along the inner drive surface 114, and can be provided at any suitable location and arrangement to facilitate alignment of the track 110 on the drive assembly 310 of FIG. 7. The drive lugs 210 may be arranged opposite to the rods 130A-130C, for example. The drive assembly 310 of FIG. 7 includes a plurality of drive teeth 312, which are rotated by drive axis 314. The drive teeth 312 and the track windows 120 are configured to allow the drive teeth 312 to cooperate with the track windows 120 for driving the track 110. The drive assembly 310 of FIG. 7 also includes flanges 316 configured to cooperate with lugs 210 to drive the track 110 off the lugs 210. Any alternative drive assembly may be used. FIG. 8 illustrates the rear suspension assembly 40 and the drive assembly 310. The track 110 is in cooperation with the drive assembly 310 for being driven thereby. The track 110 is shown in its entirety. The drive assembly 310 and the track 110 may be configured such that any suitable number of the drive teeth 312 maintain cooperation with the track 110 at all times.

The present disclosure thus advantageously provides for an endless track 110 that provides numerous advantages over the art at a reduced overall weight. For example and with respect to the configuration of FIGS. 2A and 2B, none of the reinforcing rods 130B, 130C including treads 140 are directly adjacent to another rod with treads 140. One skilled in the art will appreciate that the present disclosure provides numerous additional advantages as well.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A track for propelling a snowmobile, the track comprising:
   an inner drive surface;
   an outer ground-engaging surface opposite to the inner drive surface;
   a plurality of reinforcing rods each extending along a track width in rod rows and spaced apart at a drive pitch length along a track length; and
   a plurality of treads each extending from the outer ground-engaging surface, the plurality of treads distributed along the track length;
   wherein at least two of the plurality of reinforcing rods have different lengths, and
   the rod rows include one or more first rod rows, the track being devoid of tread along a full width of the track at the first rod rows, and
   the plurality of reinforcing rods include a first one or more rods that each extend across less than an entirety of the track width and a second one or more rods that each extend entirely across the track width, each of the second one or more rods having a larger diameter than each of the first one or more rods.

2. The track of claim 1, wherein the plurality of treads are spaced apart along the track length at a tread pitch length that is twice as long as the drive pitch length.

3. The track of claim 1, wherein every other rod row along the track length includes at least one of the plurality of treads.

4. The track of claim 3, wherein each of the first rod rows is between a second rod row including only one of the plurality of treads and a third rod row including exactly two of the plurality of treads.

5. The track of claim 4, wherein the two of the plurality of treads of the third rod row are on opposite sides of the outer ground-engaging surface.

6. The track of claim 4, wherein the only one of the plurality of treads of the second rod row is at a center of the track width.

7. The track of claim 1, wherein each of the first rod rows includes a first one of the plurality of reinforcing rods having a diameter that is less than a second one of the plurality of reinforcing rods included with each rod row with at least one of the plurality of treads.

8. The track of claim 7, wherein the first one of the plurality of reinforcing rods is shorter than the second one of the plurality of reinforcing rods.

9. The track of claim 8, wherein the first one of the plurality of reinforcing rods extends across less than an entirety of the track width and is centered between a first side of the track and a second side of the track.

10. The track of claim 8, wherein the second one of the plurality of reinforcing rods extends entirely across the track width.

11. The track of claim 1, further comprising a plurality of drive lugs extending from the inner drive surface.

12. The track of claim 11, wherein each one of the plurality of drive lugs extends from the inner drive surface opposite to a corresponding one of the plurality of reinforcing rods extending from the outer ground-engaging surface.

13. The track of claim 1, wherein at least one of the plurality of reinforcing rods varies in diameter across the track width.

14. The track of claim 1, wherein at least one of the plurality of reinforcing rods varies in shape across the track width.

15. The track of claim 1, wherein at least two of the plurality of reinforcing rods have different cross-sectional shapes.

16. The track of claim 1, wherein alternating ones of the plurality of reinforcing rods have different lengths.

17. The track of claim 1, wherein alternating ones of the plurality of reinforcing rods have different diameters.

18. A track for propelling a snowmobile, the track comprising:
   an inner drive surface;

an outer ground-engaging surface opposite to the inner drive surface;

a plurality of reinforcing rods each extending along a track width in rod rows and spaced apart at a drive pitch length along a track length; and a plurality of treads spaced apart at a tread pitch length along the track length;

wherein at least two of the plurality of reinforcing rods have different diameters, and the rod rows include one or more first rod rows, the track being devoid of tread along a full width of the track at the first rod rows, and the plurality of reinforcing rods include a first one or more rods that each extend across less than an entirety of the track width and a second one or more rods that each extend entirely across the track width, each of the second one or more rods having a larger diameter than each of the first one or more rods.

19. The track of claim 18, wherein every other rod row along the track length includes at least one of the plurality of treads, and each rod row with at least one of the plurality of treads is between two of the first rod rows.

20. The track of claim 18, wherein every other rod row along the track length includes at least one of the plurality of treads, and every rod row with at least one of the plurality of treads is between two of the first rod rows;

wherein each rod of the first rod rows between a second rod row including only one of the plurality of treads and a third rod row including exactly two of the plurality of treads.

21. The track of claim 20, wherein the two of the plurality of treads of the third rod row are on opposite sides of a center of the outer ground-engaging surface.

22. The track of claim 18, wherein at least one of the plurality of reinforcing rods varies in diameter across the track width.

23. The track of claim 18, wherein at least one of the plurality of reinforcing rods varies in shape across the track width.

24. The track of claim 18, wherein at least two of the plurality of reinforcing rods have different cross-sectional shapes.

25. The track of claim 18, wherein alternating ones of the plurality of reinforcing rods have different lengths.

26. The track of claim 18, wherein alternating ones of the plurality of reinforcing rods have different diameters.

27. A track for propelling a snowmobile, the track comprising:

an inner drive surface;

an outer ground-engaging surface opposite to the inner drive surface;

a plurality of reinforcing rods each extending along a track width in rod rows and spaced apart at a drive pitch length along a track length; and a plurality of treads spaced apart along the track length and each extending from the outer ground-engaging surface to a tread height;

wherein the tread height and the track width are sized at a tread height to track width ratio of no greater than 0.22 and the rod rows include one or more first rod rows, the track being devoid of tread along a full width of the track at the first rod rows, and the plurality of reinforcing rods include a first one or more rods that each extend across less than an entirety of the track width and a second one or more rods that each extend entirely across the track width, each of the second one or more rods having a larger diameter than each of the first one or more rods.

28. The track of claim 27, wherein the tread height is 3.3 inches and the track width is 15 inches.

29. The track of claim 27, wherein the tread height is 3.25 inches and the track width is 15 inches.

* * * * *